(No Model.)
S. FARBAKY & S. SCHENEK.
POSITIVE POLE PLATE FOR SECONDARY BATTERIES OR ACCUMULATORS.
No. 359,248. Patented Mar. 15, 1887.
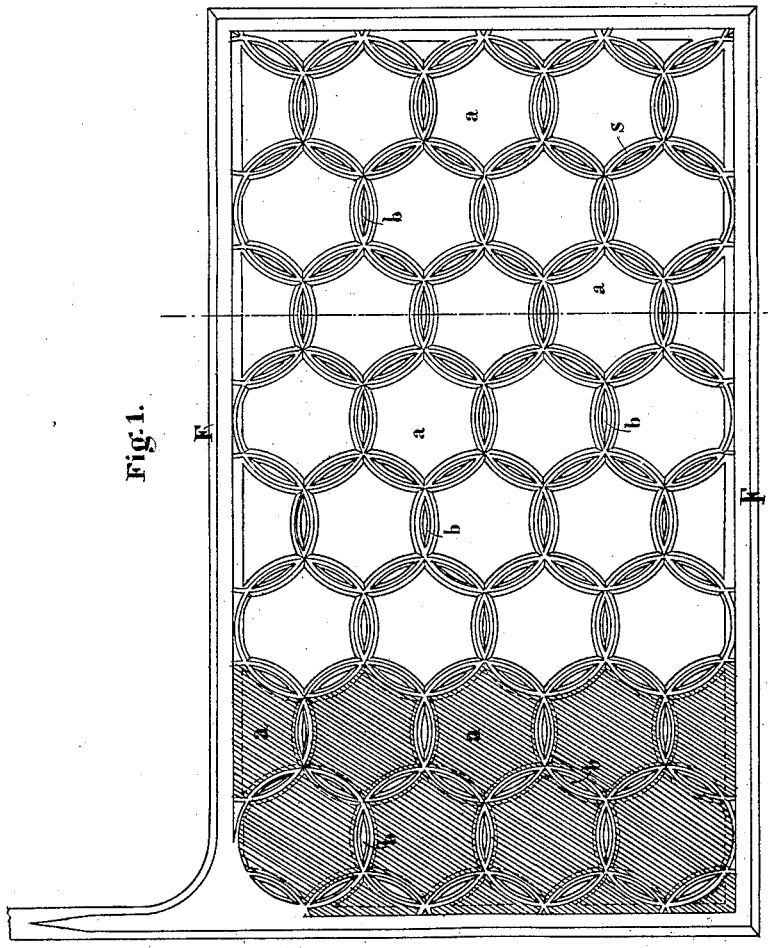

UNITED STATES PATENT OFFICE.

STEFAN FARBAKY AND STEFAN SCHENEK, OF SCHEMNITZ, AUSTRIA-HUNGARY.

POSITIVE-POLE PLATE FOR SECONDARY BATTERIES OR ACCUMULATORS.

SPECIFICATION forming part of Letters Patent No. 359,248, dated March 15, 1887.

Application filed September 25, 1886. Serial No. 214,522. (No model.)

*To all whom it may concern:*

Be it known that we, STEFAN FARBAKY and STEFAN SCHENEK, citizens of Austria-Hungary, and residents of Schemnitz, Austria-Hungary, have invented certain new and useful Improvements in the Manufacture of Positive-Pole Plates for Secondary Batteries or Accumulators, of which the following is a specification.

Our present invention relates to improvements in the manufacture of positive-pole plates for secondary batteries or accumulators, and has for its object to increase the duration of these pole-plates and consequently the durability of the accumulators; and it consists in a particular construction and arrangement of the trellis-shaped lead frames, (made by casting or stamping,) as well as in a particular distribution of the packing mass in the cells or interstices of the trellis.

We found by experience that the lead frames of the positive-pole plates wear out before normal time, on the ground that the packing mass of the same augments in volume gradually and continuously, so that by the continuous stretching out of the frame the latter becomes fissured. As soon as the crust of the crystalline protoxide of lead ($PbO_2$) which protects the metallic lead of the frame, becomes fissured, the sulphuric acid, as well as the ozone resulting from the electrolytic action in the accumulator, come in contact with the metallic lead; consequently the points of attack are multiplied and the continuity of the lead frame is interrupted. Finally the positive-pole plate breaks totally down. In order to prevent this inconvenience, we use trellis for our positive-pole plates made in such a manner that the cells or interstices are formed by circular intersecting bars instead of by rectangular bars. Further, we fill the packing mass only in the polygonal cells formed by four, five, or six arcs, while the small cells or interstices between two of the intersecting arcs remain empty.

The annexed sheet of drawings will fully explain our invention.

Figure 1 of the drawings represents in an elevation one of our improved positive-pole plates. Fig. 2 is a cross-section.

As may be seen from the drawings, the circular bars $s\,s\,s$ forming the trellis are arranged in such a manner that the packing mass is filled in hexagons $a\,a\,a$, while the smaller cells, $b\,b\,b$, remain empty.

We do not limit ourselves to use only the hexagonal form for the cells $a\,a\,a$, but reserve to ourselves the right to give them any desired shape. In consequence of this particular mode of distributing the packing mass in the pole-plate the increase of its volume exercises its action only to the smaller separated cells $b\,b\,b$, and the sides of the polygons $a\,a\,a$ are not stretched, but only pressed one against the other. The main frame of the positive-pole plates is not submitted to any remarkable change of shape, and therefore protected against destruction.

We claim as our invention—

Positive-pole plates for secondary batteries or accumulators, consisting of frames of lead, F, with trellis formed by circular intersecting bars $s\,s\,s$, constituting polygonal cells or interstices $a\,a\,a$, which are filled with the packing mass, and also smaller cells, $b\,b\,b$, between two of the intersecting arcs, which cells remain empty in order to interrupt regularly the continuity of the packing mass.

Signed at Vienna, in the Empire of Austria-Hungary, this 6th day of September, 1886.

STEFAN FARBAKY.
STEFAN SCHENEK.

Witnesses:
EDMUND JUSSEN,
EDMUND JUSSEN, Jr.